United States Patent
Aizaki et al.

[11] Patent Number: 5,140,881
[45] Date of Patent: Aug. 25, 1992

[54] APPARATUS FOR MANUFACTURING A CYLINDER WITH A CONNECTED SLEEVE

[75] Inventors: Masaru Aizaki; Takao Kojima, both of Saitama, Japan

[73] Assignee: Jidosha Kiki Co., Ltd., Tokyo, Japan

[21] Appl. No.: 642,142

[22] Filed: Jan. 15, 1991

Related U.S. Application Data

[62] Division of Ser. No. 380,993, Jul. 17, 1989, abandoned.

[30] Foreign Application Priority Data

Jul. 21, 1988 [JP] Japan .................. 63-182640

[51] Int. Cl.⁵ .................. B26D 3/00; B21D 31/02
[52] U.S. Cl. .................. 83/191; 83/54; 72/327
[58] Field of Search .................. 83/54, 188, 191; 72/327, 335; 285/189, 286; 92/163, 169.1, 164

[56] References Cited

U.S. PATENT DOCUMENTS

| | | | |
|---|---|---|---|
| 295,090 | 3/1884 | Whitman | 83/191 X |
| 1,432,073 | 10/1922 | Lowy | 83/191 X |
| 2,050,867 | 8/1936 | Teare | 285/189 |
| 2,183,043 | 12/1939 | Kerr | 285/189 |
| 3,064,707 | 11/1962 | Walts | 72/327 X |
| 3,271,988 | 9/1966 | Klinksiek | 83/191 X |
| 3,289,511 | 12/1966 | Lansky | 83/191 |
| 4,227,393 | 10/1980 | McElhaney | 83/191 X |
| 4,733,722 | 3/1988 | Forbes et al. | 285/189 X |
| 4,765,173 | 8/1988 | Schellstede | 72/325 |
| 4,856,824 | 8/1989 | Clausen | 285/189 X |

FOREIGN PATENT DOCUMENTS

| | | | |
|---|---|---|---|
| 1910642 | 9/1970 | Fed. Rep. of Germany | 285/286 |
| 1062963 | 4/1954 | France | 285/286 |
| 60-127104 | 8/1985 | Japan . | |
| 62-56486 | 4/1987 | Japan . | |
| 0085947 | 8/1957 | Netherlands | 285/286 |

Primary Examiner—Edward K. Look
Assistant Examiner—John Ryznic
Attorney, Agent, or Firm—Flynn, Thiel, Boutell & Tanis

[57] ABSTRACT

A cylinder with a connected sleeve for supply and displacement of fluid through connection to an external piping, as well as an apparatus for and a method of manufacturing same are disclosed. An opening is formed to extend through the wall of a tubular body of the cylinder to provide a communication between the interior and the exterior thereof. A substantially flat abutment is formed on the outer surface around the opening. The outer peripheral surface of a connected sleeve is annularly in contact with the inner peripheral edge of the flat abutment, and the tubular body and the connected sleeve are joined together as by a welding operation.

2 Claims, 6 Drawing Sheets

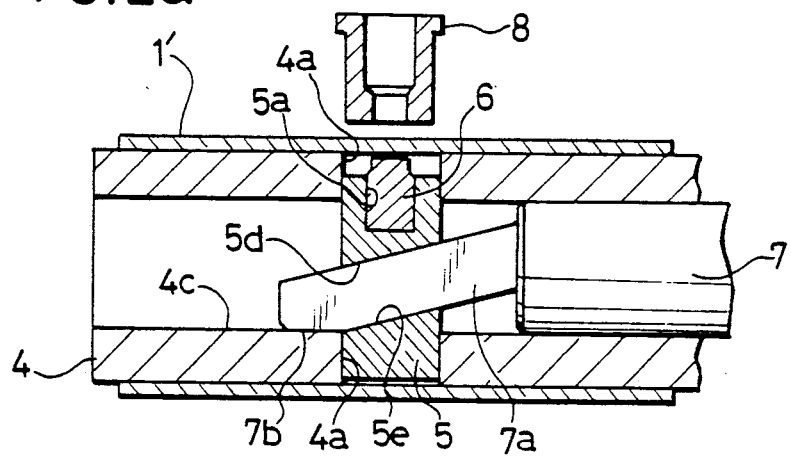
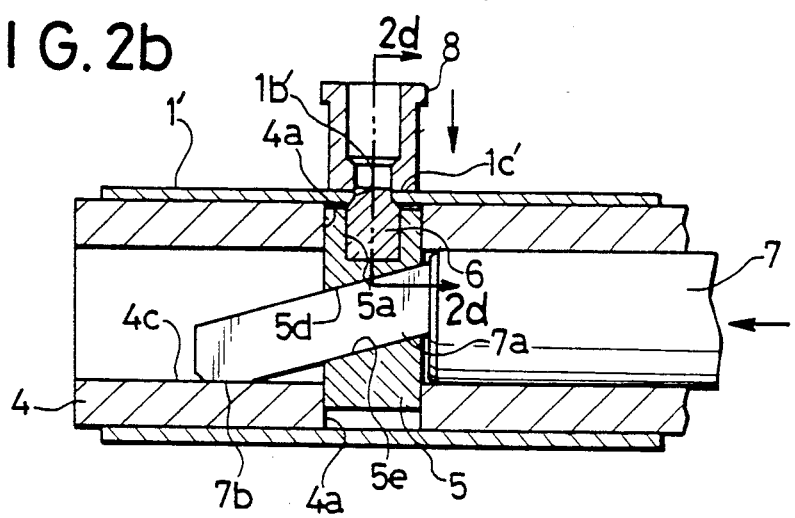
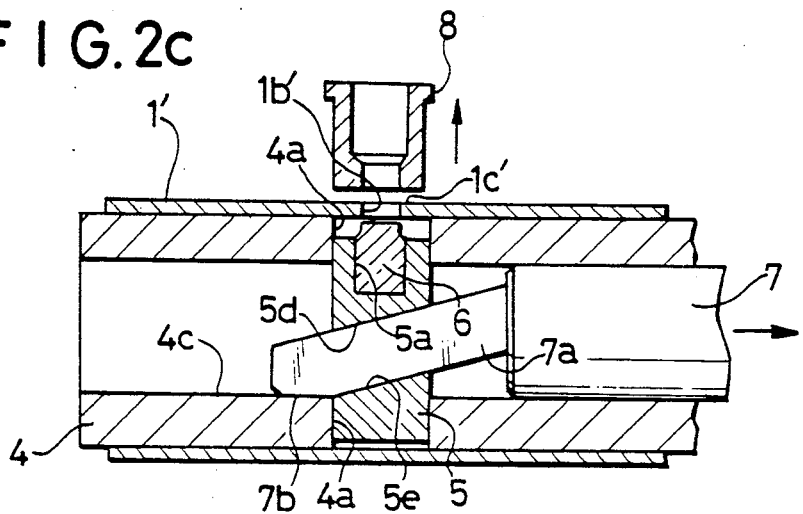

APPARATUS FOR MANUFACTURING A CYLINDER WITH A CONNECTED SLEEVE

This application is a division of U.S. Ser. No. 07/380,993, filed Jul. 17, 1989 now abandoned.

BACKGROUND OF THE INVENTION

The invention relates to a cylinder with a connected sleeve for supply and displacement of fluid thereto or therefrom which is mounted on a given location on an external curved surface of a tubular body and which communicates with the interior of the body for connection thereof with an external piping, and an apparatus for and a method for manufacturing same.

PRIOR ART

FIG. 11 illustrates a power steering system which employs a cylinder 10 having an oil tight chamber which is defined by a pair of oil tight sleeves 11, 12 which are fitted inside a tubular body 1, and a rod 13 having a rack 13a formed on its portion toward its outer end. The oil tight chamber is divided into a pair of pressure chambers 15 and 16 by an annular piston 14 which is integrally mounted on the drive rod 13. Pressure oils from a pump, not shown, are supplied to these pressure chambers 15, 16 through communication tubing 19, 20, respectively, as controlled by a valve mechanism 18 which is integrally mounted on and secured to a casing 17, contiguous with the cylinder 10, in a region corresponding to the rack 13a, thus urging the drive rod 13 depending on a steering direction.

The rack 13a on the drive rod 13 is in meshing engagement with a pinion which is contained within a housing 18a of the valve mechanism 18 and driven for rotation by a steering wheel, not shown, so that the rotation of the wheel can be transmitted to cause a lateral displacement of steerable road wheels.

In the above construction, the cylinder 10 is provided with connected sleeves 2, 3 for supply or displacement of fluid, which are mounted on the outer curved surface of the cylinder toward the opposite ends out of the extent of operation of the piston 14 contained therein and which provides a connection between the respective pressure chambers 15, 16 and the communication tubings 19, 20. In the prior art practice, the sleeves 2, 3 are mounted on the tubular body 1 of the cylinder in a manner to be described below.

Specifically, referring to FIGS. 8a and 8b, the tubular body 1 which defines the cylinder is initially formed with a communication opening 1a which extends through its peripheral wall. The connected sleeve 2 includes a projection 2a of a reduced diameter in the form of a pillbox, which is inserted into the communication opening 1a, and the both are joined together by a projection welding process (see Japanese Laid-Open Utility Model Application No. 56,486/1987). Alternatively, as shown in FIG. 9, the connected sleeve 3 may be formed with an arcuate surface 3a which conforms to the curvature of the outer curved surface of the tubular body, and the arcuate surface is then seated upon the body around the edge of the communication opening 1a formed therein, whereupon the both members may be welded together (see Japanese Laid-Open Utility Model Application No. 127,104/1985, FIG. 3).

In the former procedure in which the communication opening 1a is formed to extend through the peripheral wall of the tubular body 1 and is then utilized as a guide opening to position the connected sleeve 2 suffers from the following difficulties:

1. Because the outer edge of the communication opening 1a is defined by a three dimensional curve, a contact between such edge and the connected sleeve 2 occurs at a pair of points 9a, 9b on such curve during the welding process (see FIG. 8(b)), resulting in a poor positioning stability.

2. An air gap C (see FIG. 8(a)) is left between the both members at other than the pair of points of contact 9a, 9b, giving rise to the occurrence of a sputtering in the vicinity of such points 9a, 9b which is attributable to the flow of a high current during the welding process.

3. Due to the factor mentioned under paragraph 1, the points of contact 9a, 9b move in directions indicated by arrows in FIG. 8(b) as the welding operation proceeds, which causes an excessive penetration when the pressure applied is insufficient.

4. When the pressure is increased to suppress the excessive penetration, the trueness of circularity of the tubular body 1 will be degraded.

5. Since the amount of heat generated in the region being welded depends on the location as the points of contact 9a, 9b move, it will be seen that the very two points where the both members have been in contact with each other initially will be the first to become softened, with consequence that the projection 2a of the connected sleeve 2 which is in the form of the pill case will be deformed with a corresponding deformation of its internal bore 2b in the manner illustrated in FIG. 10.

It will be seen that as a result of these difficulties, the quality of products is less than satisfactory, causing problems that a seal 21 which is fitted into the outer peripheral surface of the piston 14 during assembly may become abraded or broken as it moves past the location of the communication opening 1a formed in the tubular body 1 or may be damaged to degrade its durability.

In the latter procedure using the arcuate surface 3a of the connected sleeve 3 which conforms to the curvature of the outer curved surface of the tubular body, problems which relate to the movement of the points of contact as occurred in the former arrangement will not be experienced, but connected sleeves 3 of a common size or configuration cannot be used if the external diameter of the tubular body differs, resulting in an increased cost of the products.

SUMMARY OF THE INVENTION

Therefore, it is an object of the invention to provide a cylinder with a connected sleeve for supply and displacement of fluid in which a joint between a tubular body of the cylinder and the connected sleeve is achieved reliably while preventing a leakage of fluid from such joint, and an apparatus for and a method of manufacturing same.

It is another object of the invention to provide a cylinder with a connected sleeve for supply and displacement of fluid which is capable of preventing a deformation of an internal passage defined within a tubular body of the cylinder and the connected sleeve, and an apparatus for and a method of manufacturing same.

Above objects are achieved in accordance with the invention by forming a substantially flat abutment on the outer surface of a peripheral edge of an opening which is formed in a wall of a tubular body to communicate therethrough and against which a connected sleeve is secured.

BRIEF DESCRIPTION OF THE DRAWINGS

FIGS. 2(a), (b) and (c) are side elevations, partly in longitudinal sections, of one form of an apparatus for manufacturing a cylinder according to the invention, illustrating different phases of operation;

FIGS. 3 to 7 show components of the apparatus shown in FIG. 2; specifically.

FIG. 5 is a perspective view of a punch;

FIG. 7 is a perspective view of a die;

DESCRIPTION OF EMBODIMENT

Figure 1:
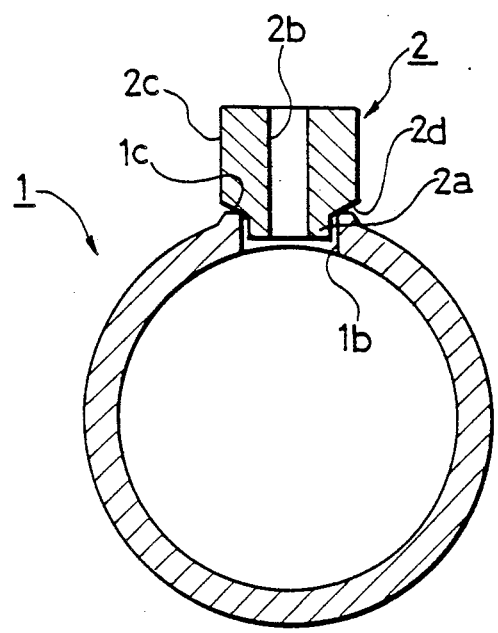
FIG. 1 is a cross section of a cylinder according to one embodiment of the invention taken through the axis of a connected sleeve.
Figure 3A:
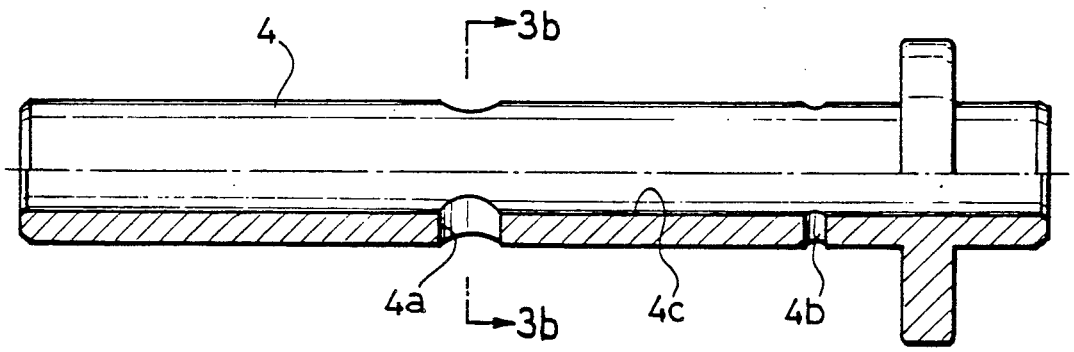
FIG. 3(a) is a front view of a guide member, with its lower half being shown in section.
Figure 3B:
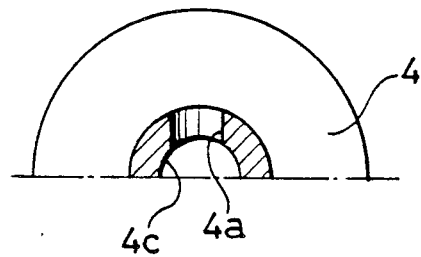
FIG. 3(b) is a cross section taken along the line X—X shown in FIG. 3(a)
Figure 4A:
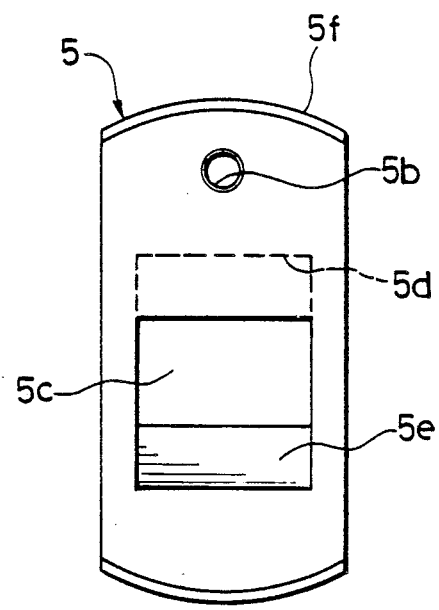
FIG. 4(a) is a side elevation of a punch holder.
Figure 4B:
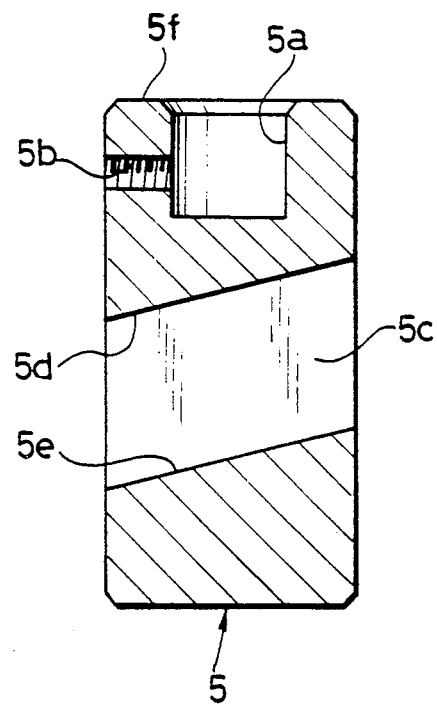
FIG. 4(b) is a longitudinal section of the punch holder, as viewed from the front side.
Figure 5:
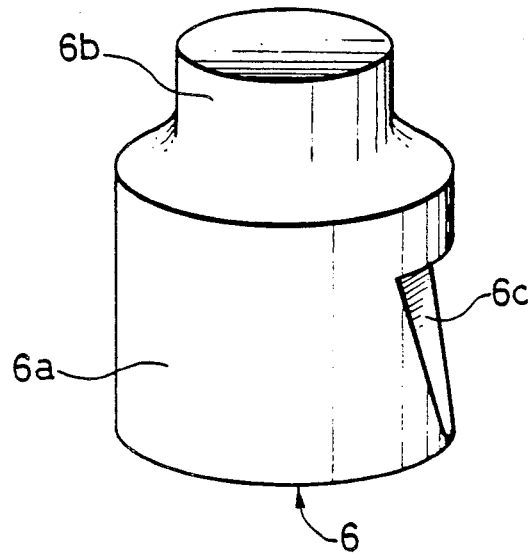
Figure 6A:
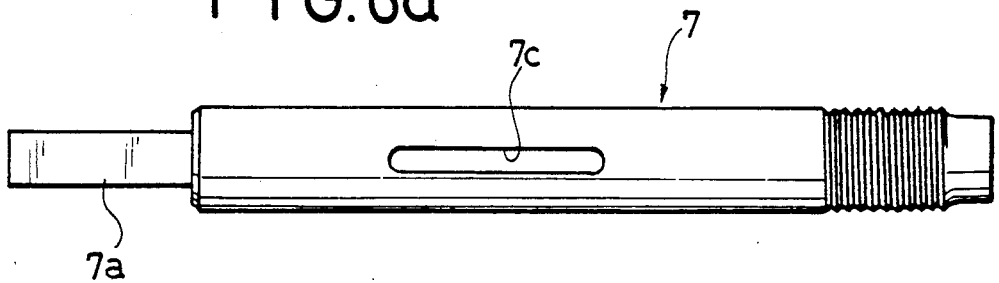
FIG. 6(a) is a plan view of an overall cam member.
Figure 6B:
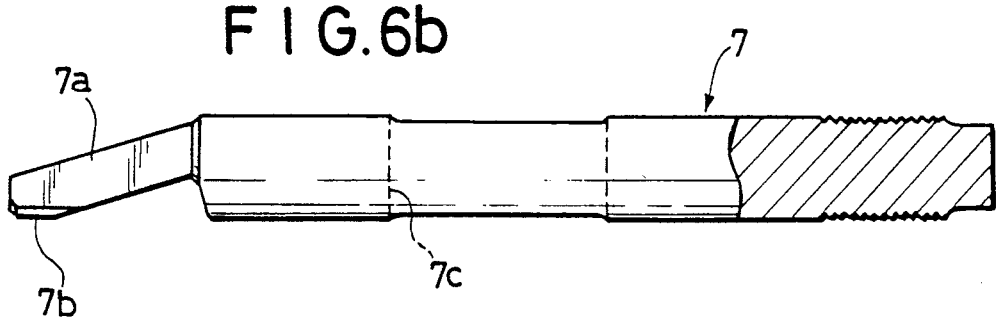
FIG. 6(b) is a front view of the cam member.
Figure 6C:
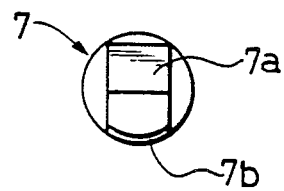
FIG. 6(c) is a side elevation of the cam member.
Figure 7:
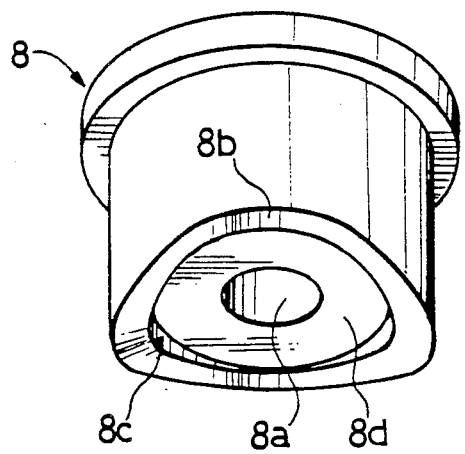

Referring to FIG. 1, an embodiment of the invention will now be described. Specifically, a cylinder of this embodiment comprises a tubular body 1 having a communication opening 1b formed therein, the peripheral edge of which is formed with a flat abutment 1c which peripherally defines a line of contact between the edge and a connected sleeve 2.

Figure 8A:
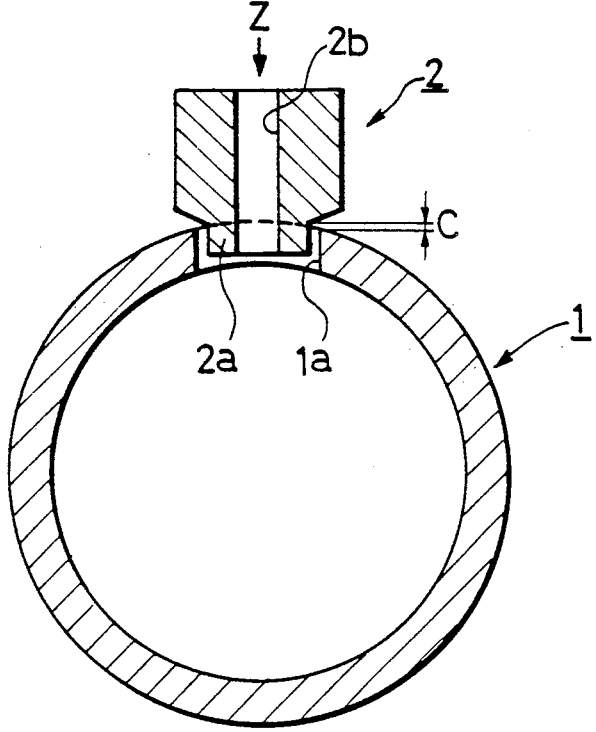
FIG. 8(a) is a view similar to FIG. 1 showing an example of a conventional cylinder.
Figure 8B:
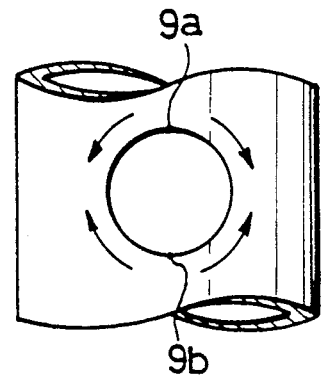
FIG. 8(b) is an illustration of points of contact as viewed from the direction Z shown in FIG. 8(a)
Figure 9:
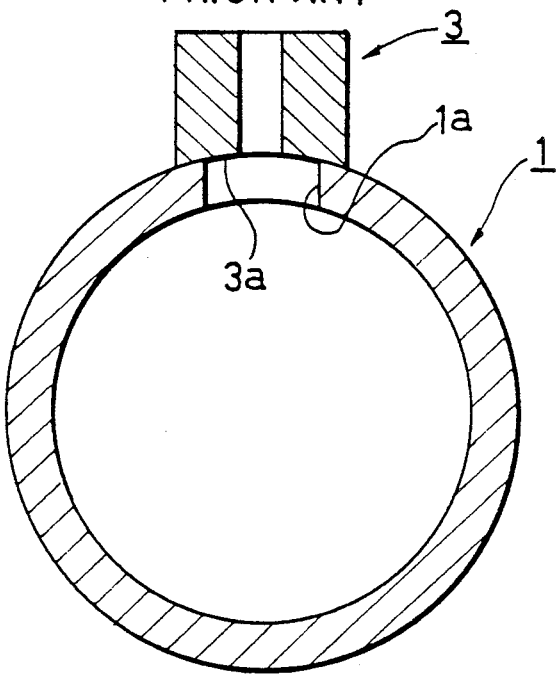
FIG. 9 is a similar view to FIG. 1 illustrating another example of conventional cylinder.
Figure 10:
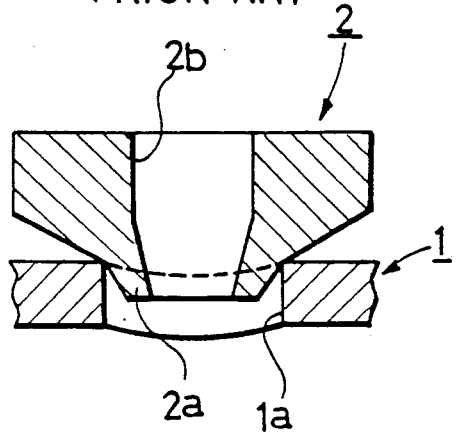
FIG. 10 is a cross section, to an enlarged scale, of part of the arrangement shown in FIG. 8.
Figure 11:
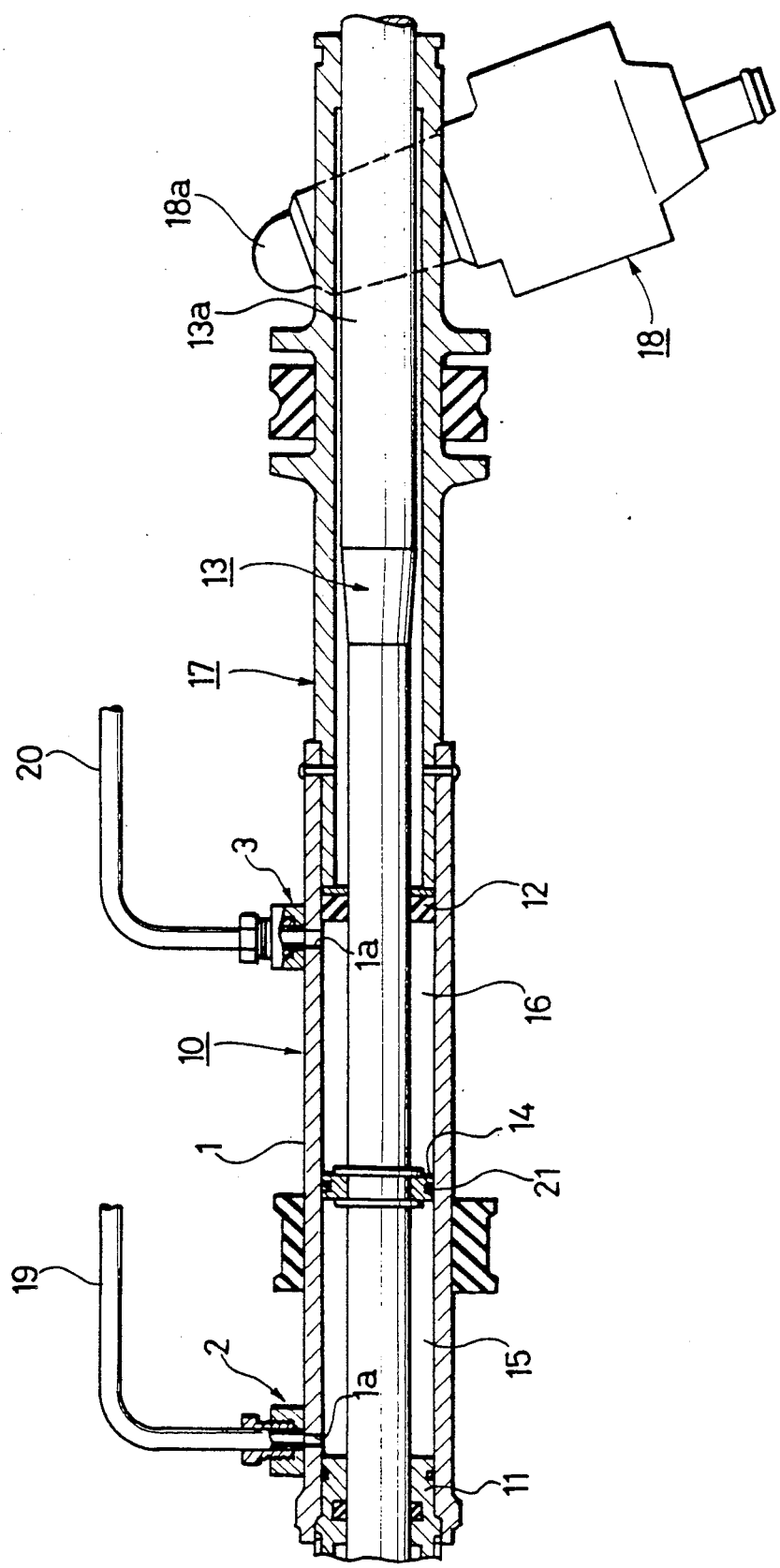
FIG. 11 is a longitudinal section of one form of power steering system which utilizes a cylinder.

A procedure to manufacture the cylinder will now be described more specifically. Initially, a communication opening 1b is formed to extend through the peripheral wall of the tubular body at a given location, and an abutment 1c having a flat surface is defined so as to surround the opening 1b. The communication opening may be machined, as by a pressure forming from the inside of the tubular body at the same time as the abutment is formed, or may be machined separately from the abutment as by a press or cutting operation. The connected sleeve 2, which is in itself similar to the one shown in FIG. 8, is then seated around the communication opening 1b thus formed, with its projection 2a in the form of a pill case being inserted into the opening 1b. The both members are joined together by a projecting welding process. When a cylinder is manufactured according to such method, a tapered portion 2d of the connected sleeve 2 extending from the projection 2a to a portion 2c of a greater diameter will be in contact with the outer edge of the communication opening 1b over the entire perimeter from the very stage of seating, whereby its positioning is facilitated while preventing the occurrence of a sputtering, an excessive penetration and a resulting deformation of the internal opening of the connected sleeve as the welding operation proceeds. A degradation in the trueness of circularity of the tubular body can also be prevented by suppressing the magnitude of the pressure applied. The procedure described is equally applicable to cylinders of varied diameters.

In accordance with the invention, the pressure forming which forms the abutment 1c on the tubular body is performed by a novel press apparatus, which will not be described with reference to FIGS. 3 to 7 together with FIG. 2. Referring to these Figures, a tubular work 1' is fitted over a guide member 4, which is formed with a pair of diametrically aligned openings 4a at a location centrally of its lengthwise dimension, and which is also formed with a guide pin receiving opening 4b of a reduced diameter which extends diametrically therethrough at a location spaced from the openings 4a (see FIG. 3). A punch holder 5 having a punch receiving opening 5a formed in its one end (see FIG. 4) is slidably fitted into the openings 4a, and a punch 6 (see FIG. 5) is mounted in the opening 5a. It is desirable that the punch holder 5 has a work contacting surface 5f as an arcuate surface conforming to the inner peripheral surface of work 1', but may also be an arcuate surface of a lesser diameter. The punch 6 comprises a portion 6a which is fitted into the opening 5a and a portion 6a which bears against the work. A flat surface 6c is formed at a selected position around the outer peripheral surface of the portion 6a and is inclined radially inward as it proceeds from the bottom thereof which is inserted into the opening 5a toward the portion 6b. The flat surface 6c is adapted to engage the free end of a locking screw, not shown, which is threadably engaged with a threaded bore 5b formed to extend into the punch receiving opening 5a from the outside of the holder, thereby preventing the withdrawal of the punch 6 from the punch holder 5 as the punch is retracted relative to the work 1' subsequent to the completion of the press operation. An opening 5c, which is square-shaped in section, extends diametrically through the punch holder 5 generally at the middle lengthwise and at an angle with respect to the horizontal. A cam member 7 is slidably inserted into an opening 4c formed in the guide member 4 and has a projection 7a at its inner end, which is fitted into the square opening 5c. The projection 7a of the cam member 7 comprises a pillar which extends downwardly from the front end face of the cam member in its upper region as it extends forwardly.

The upper and lower surfaces of the pillar are disposed at an angle with respect to the horizontal which is equal to the angle at which the upper and the lower inclined surfaces 5d, 5e of the square opening 5c are disposed. At its front end, the pillar has a bottom surface which is shaped as an arcuate surface 7b conforming to the inner peripheral surface of the opening 4c formed in the guide member 4 so that the arcuate surface 7b is in sliding contact with the inner peripheral surface of the guide member to be supported thereby as the cam member 5 moves back and forth. The cam member 7 is centrally formed with a lengthwise elongate slot 7c (see FIG. 6) which is engaged by a guide pin, not shown, which is inserted through the opening 4b formed in the guide member, thereby preventing a rotation of the cam member and assuring an engagement between the projection 7a of the cam member and the square opening 5c in the punch holder.

Referring to FIG. 2, a die 8 is disposed in opposing relationship with the punch 6 with the work 1', which is fitted around the guide member 4, interposed therebetween, and is formed with an opening 8a (see FIG. 7) in alignment with its axis into which the free end of the work bearing portion 6b of the punch 6 may be fitted. An end face of the die which faces the punch is formed into an arcuate surface 8b which conforms to the outer curved surface of the work 1'. A recess 8c is formed in the arcuate surface 8b and has a diameter slightly greater than the maximum diameter of the work bearing portion 6b of the punch which exists at its junction with the punch portion 6a, with the bottom surface of the recess 8c being formed as a flat surface 8d.

The operation of the press apparatus mentioned above will now be described. Initially, the guide member 4, the punch holder 5, the punch 6, and the cam member 7 are assembled together, and the work 1' is fitted over the guide member 4 and then positioned thereon. The die 8 is disposed in opposing relationship with the punch holder 5 (see FIG. 2(a)).

The cam member 7 is then slid forwardly as indicated by an arrow in FIG. 2(b) within the guide member 4 to bring the die 8 into abutment against the outer curved surface of work 1'. The camming action of the projection 7a of the cam member 7 causes the punch holder 5 to be urged toward the die 8 along the opening 4a formed in the guide member 4, thereby simultaneously forming a communication opening 1b' and a flat abutment 1c' which surrounds the opening 1b' through and on the wall of the work 1'. Subsequently, the cam member 7 is slid rearwardly within the guide member 4, as indicated by an arrow in FIG. 2(c), and the die 8 is moved away from the outer curved surface of work 1', whereby the camming action of the projection 7a of the cam member 7 is effective to retract the punch holder 5 into the opening 4a formed in the guide member 4, thus moving the punch 6 away from the work 1'. As shown in FIG. 1, the connected sleeve 2 is fitted in and seated upon the communication opening 1b' and the abutment 1c' formed in and on the work 1' thus formed, and the both members are joined together by a projection welding process.

In the embodiment described above, the apparatus for manufacturing a cylinder comprises a press apparatus which simultaneously forms a communication opening and an abutment for the connected sleeve. However, it should be obvious that a machining which does not utilize a die is also possible depending on the internal diameter, the wall thickness and the required area of seat of the sleeve. It should be understood that the term "cylinder" includes a cylinder having an abutment 1c formed by other machining means such as bulge operation.

What is claimed is:

1. An apparatus for manufacturing a cylinder with a connected sleeve for supply and displacement of fluid, comprising:

a guide member fitted inside a tubular work;

a punch holder held by said guide member and reciprocable in the diametrical direction of said guide member;

a punch carried by said punch holder and adapted to be pressed against an internal surface of the tubular work when said punch holder moves within said guide member; and actuator means for causing a reciprocating motion of said punch holder, said actuator means comprising an opening formed in said punch holder at an angle with respect to the axis of said guide member, and a cam member inserted into said opening in said punch holder and reciprocable in the axial direction of said guide member, said opening in said punch holder is inclined and square-shaped in cross section, said opening having upper and lower inwardly facing surfaces which are parallel to each other and inwardly facing parallel side surfaces, said cam member being square-shaped and inclined in conformance with said opening in said punch holder.

2. The apparatus according to claim 1 in which a die is disposed in opposing relationship with said punch, said tubular work, which is fitted over the guide member, being interposed between said punch and said die.

* * * * *